US008876061B1

(12) United States Patent
Tillotson

(10) Patent No.: US 8,876,061 B1
(45) Date of Patent: Nov. 4, 2014

(54) METHODS AND SYSTEMS FOR BEAM POWERED PROPULSION

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 219 days.

(21) Appl. No.: 13/297,893

(22) Filed: Nov. 16, 2011

(51) Int. Cl.
*B64G 1/40* (2006.01)
*B64G 1/44* (2006.01)
*F03H 1/00* (2006.01)
*C06D 5/00* (2006.01)
*F02K 9/64* (2006.01)
*F01K 27/00* (2006.01)
*F01K 15/00* (2006.01)

(52) U.S. Cl.
USPC .................... 244/171.1; 244/172.8; 60/203.1; 60/206; 60/643; 60/668

(58) Field of Classification Search
USPC .................. 244/168, 169, 171.1, 172.8; 89/8; 60/200.1, 201, 202, 203.1, 206, 668, 60/643
See application file for complete search history.

(56) References Cited

U.S. PATENT DOCUMENTS

| | | | | |
|---|---|---|---|---|
| 3,083,528 A | * | 4/1963 | Brown | 60/203.1 |
| 3,818,700 A | * | 6/1974 | Kantrowitz et al. | 244/74 |
| 3,825,211 A | * | 7/1974 | Minovitch | 244/171.1 |
| 4,036,012 A | * | 7/1977 | Monsler | 60/203.1 |
| 4,614,405 A | * | 9/1986 | Brandenberg et al. | 359/832 |
| 4,939,976 A | | 7/1990 | Minovitch | |
| 5,152,135 A | * | 10/1992 | Kare | 60/203.1 |
| 5,520,356 A | * | 5/1996 | Ensley | 60/203.1 |
| 5,541,776 A | * | 7/1996 | Kobayashi et al. | 359/665 |
| 5,542,247 A | * | 8/1996 | Bushman | 60/203.1 |
| 6,364,253 B1 | * | 4/2002 | Cavanagh | 244/190 |
| 6,459,205 B1 | | 10/2002 | Schall et al. | |
| 6,488,233 B1 | * | 12/2002 | Myrabo | 244/62 |
| 6,534,705 B2 | * | 3/2003 | Berrios et al. | 244/172.7 |
| 6,936,760 B2 | * | 8/2005 | Rogers et al. | 244/172.8 |
| 7,080,504 B2 | * | 7/2006 | Pais | 60/203.1 |
| 7,118,075 B2 | * | 10/2006 | Schubert | 244/169 |
| 7,413,147 B2 | * | 8/2008 | Bae | 244/171.5 |
| 2008/0197238 A1 | * | 8/2008 | Bae | 244/171.1 |
| 2011/0272528 A1 | * | 11/2011 | Maiboroda | 244/158.5 |
| 2013/0061571 A1 | * | 3/2013 | Burdine | 60/204 |

OTHER PUBLICATIONS

Laser Propulsion; http://en.wikipedia.org/wiki/Laser_propulsion#Heat_Exchanger_.28HX.29_Thruster; Oct. 21, 2011; 4 pages.

* cited by examiner

*Primary Examiner* — Christopher Jetton
*Assistant Examiner* — Daniel Wagnitz
(74) *Attorney, Agent, or Firm* — Armstrong Teasdale LLP

(57) ABSTRACT

A method for producing a heated fluid for use within an engine for propulsion of a vehicle is described. The method includes receiving cooled fluid from a fluid source, directing the cooled fluid between a first window configured to operate as a structural member of the engine and a second window configured to separate the cooled fluid from a heated fluid, passing an electromagnetic beam through the first window and the second window, absorbing the passed electromagnetic beam with a heat exchanger within the engine, and directing the cooled fluid through the heat exchanger to become heated fluid.

20 Claims, 5 Drawing Sheets

METHODS AND SYSTEMS FOR BEAM POWERED PROPULSION

BACKGROUND

The field of the disclosure relates generally to propulsion methodologies, and more specifically, to methods and systems for beam powered propulsion.

Most modern spacecraft or aircraft rely on chemical propulsion, for example, burning fuel and oxidizer to produce both energy and reaction mass. Various engine designs are used to convert this energy and reaction mass into thrust. Performance of these propulsion schemes is limited by the energy of chemical reactions and by the molecular mass of the reaction products, for example, water and carbon dioxide.

Alternative approaches have been examined. At least some of these alternative approaches use an external energy source, such as a beam of electromagnetic energy. By eliminating the need for combustion, the propellant can then be chosen to have low molecular mass, and therefore high exhaust speed for a given temperature. Since engine materials are limited by the peak temperature at which they can operate, this beamed energy approach allows higher exhaust speed (and therefore higher specific impulse) than chemical propulsion.

In one beamed energy solution, sometimes referred to as a windowed heat exchanger, the beam of electromagnetic energy (typically a laser beam) passes through a window on the side of a rocket or jet engine to reach a heat exchanger inside the engine. The window both confines a high pressure and handles a large temperature gradient. However, a window that performs both functions must be thick and therefore heavy, and such a window is typically made of exotic and costly materials.

BRIEF DESCRIPTION

In one aspect, a method for producing a heated fluid for use within an engine for propulsion of a vehicle is provided. The method includes receiving cooled fluid from a fluid source, directing the cooled fluid between a first window configured to operate as a structural member of the engine and a second window configured to separate the cooled fluid from a heated fluid, passing an electromagnetic beam through the first window and the second window, absorbing the passed electromagnetic beam with a heat exchanger within the engine, and directing the cooled fluid through the heat exchanger to become heated fluid.

In another aspect, an electromagnetic beam powered propulsion system is provided that includes a chassis that defines a volume and includes an inlet, a first window integrated with the chassis, the first window substantially transparent to an electromagnetic beam, a second window disposed within the chassis, the second window substantially transparent to the electromagnetic beam, a heat exchanger placed within the chassis and operable to absorb electromagnetic beams that pass through the first window and the second window, and a working fluid. The chassis is configured to route the working fluid at a first temperature from the inlet between the first window and the second window, the chassis is configured to further route the working fluid through the heat exchanger such that the working fluid is raised to a second temperature, the second temperature making the working fluid operable for propulsion.

In still another aspect, a vehicle engine is provided that includes a chassis including a tank configured for storage of a working fluid at a first temperature, a first window integrated with the chassis, the first window substantially transparent to an electromagnetic beam, a second window disposed within the chassis, the second window substantially transparent to the electromagnetic beam, a heat exchanger placed within the chassis and operable to absorb electromagnetic beams that pass through the first window and the second window, and a nozzle. The chassis is configured to route the working fluid from the tank between the first window and the second window. The chassis is configured to further route the working fluid through the heat exchanger such that the working fluid is raised to a second temperature, and configured to further route the working fluid at the second temperature through the nozzle to provide propulsion.

The features, functions, and advantages that have been discussed can be achieved independently in various embodiments or may be combined in yet other embodiments further details of which can be seen with reference to the following description and drawings.

DETAILED DESCRIPTION

The specific technical problem addressed by the described embodiments is the transferring of energy from an electromagnetic beam into a propellant with lower molecular mass and higher exhaust speed than previous beam powered solutions.

Figure 1:
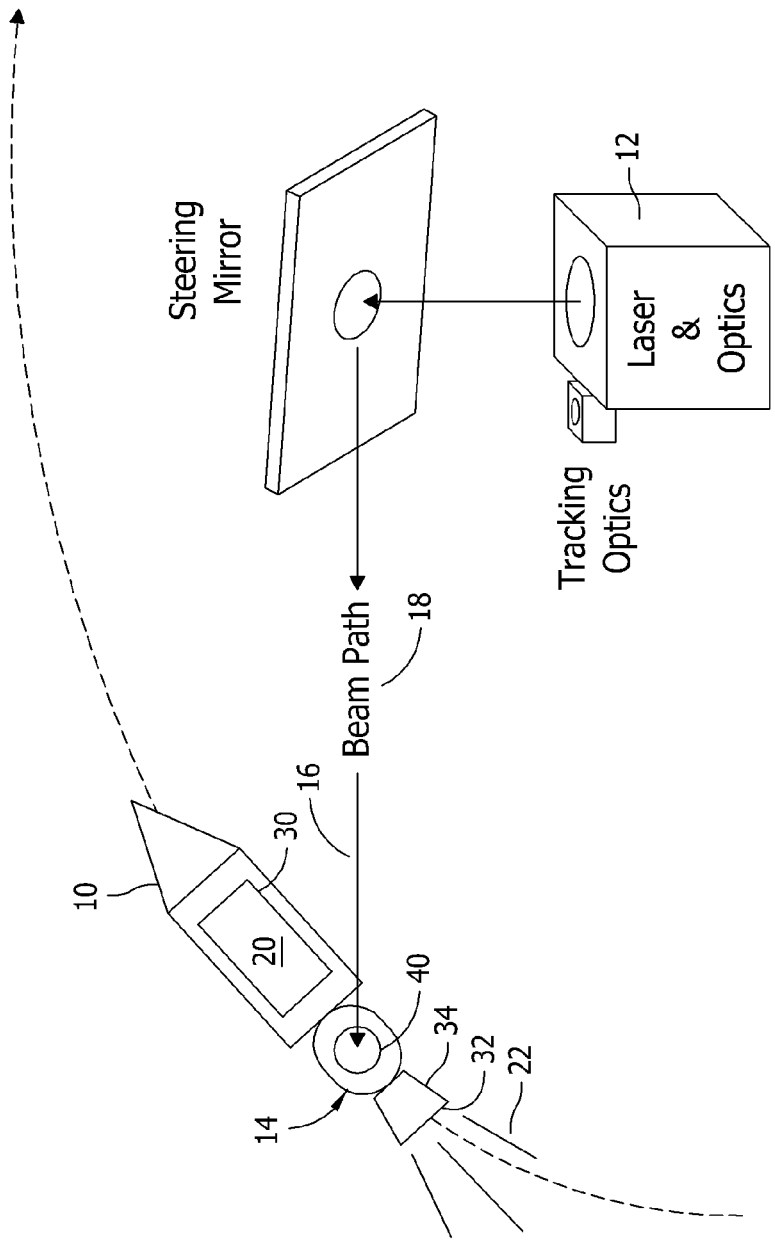
FIG. 1 is a schematic illustration of the operation of a beam-powered rocket vehicle using a beam source.

FIG. 1 illustrates schematically the operation of a beam-powered rocket vehicle 10 using a beam source 12. Beam-powered rocket vehicle 10 includes a beam receiver 14 that collects a beam 16 from beam source 12 that is transmitted along a beam path 18 and transfers its energy into the propellant 20 within the vehicle 10 as heat, thereby producing a hot propellant exhaust 22. In this system, the beam 16 of electromagnetic energy (typically a laser beam) impinges on a set of tubes (not shown) accessible via the beam receiver 14. The tubes are typically arranged on a flat plate and are evenly spaced such that each tube carries a fraction of the propellant 20 that flows from a tank 30 into the nozzle 32 of an engine 34. Outer surfaces of the tubes absorb the electromagnetic energy as heat. The heat flows through the wall of the tube. From the wall of the tube, heat flows into the propellant 20 to generate the hot propellant exhaust 22.

One embodiment of a beam-powered rocket vehicle 10 is referred to as a "heat exchanger laser thruster". In this solution, the beam of electromagnetic energy (typically a laser beam) impinges on a set of tubes. The tubes are typically arranged on a flat plate. Each tube carries a fraction of the propellant that flows from a tank into the nozzle of an engine. Outer surfaces of the tubes absorb the electromagnetic energy as heat. The heat flows through the wall of the tube. From the wall of the tube, heat flows into the propellant. Such a configuration is generally referred to as a second surface heat exchanger as the working fluid is contained by an opaque material, such as metal tubes that carry a high heat flux from the surface where it absorbs laser light to the surface in contact with the working fluid.

Figure 2:
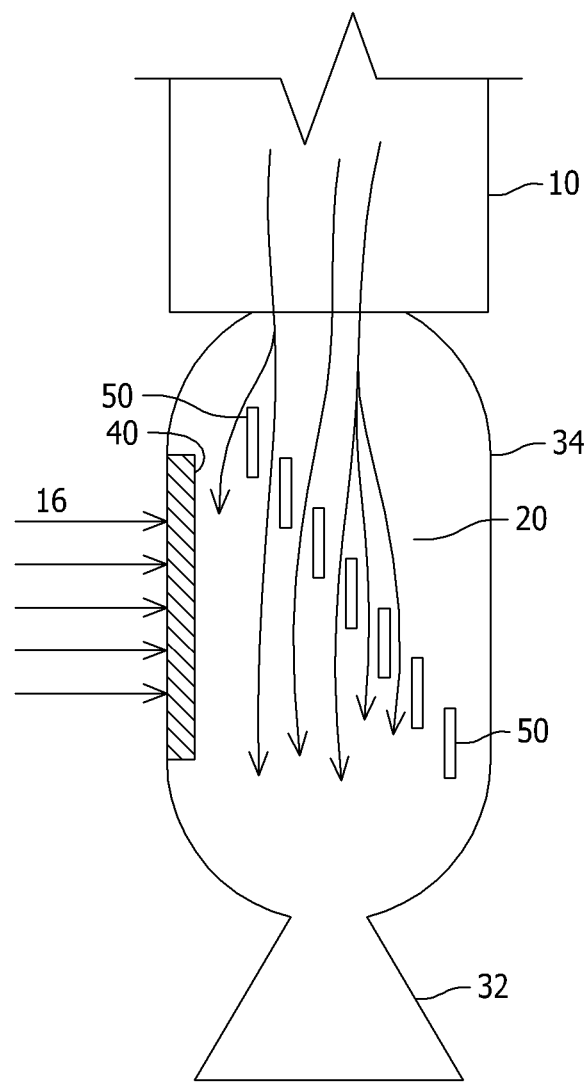
FIG. 2 is an illustration of a beam-powered engine that incorporates a windowed heat exchanger.

In the illustrated embodiment, beam-powered rocket vehicle 10 incorporates a windowed heat exchanger as further illustrated by FIG. 2. In this embodiment, the beam 16 of electromagnetic energy (typically a laser beam) passes through a window 40 on the side of a rocket 10 or jet engine. Inside the engine 34, the beam 16 is either is directly absorbed by the propellant 20 or impinges on a surface in direct contact with the propellant such as heat exchanger 50. The window 40 both admits the electromagnetic energy and confines the propellant 20.

Figure 3:
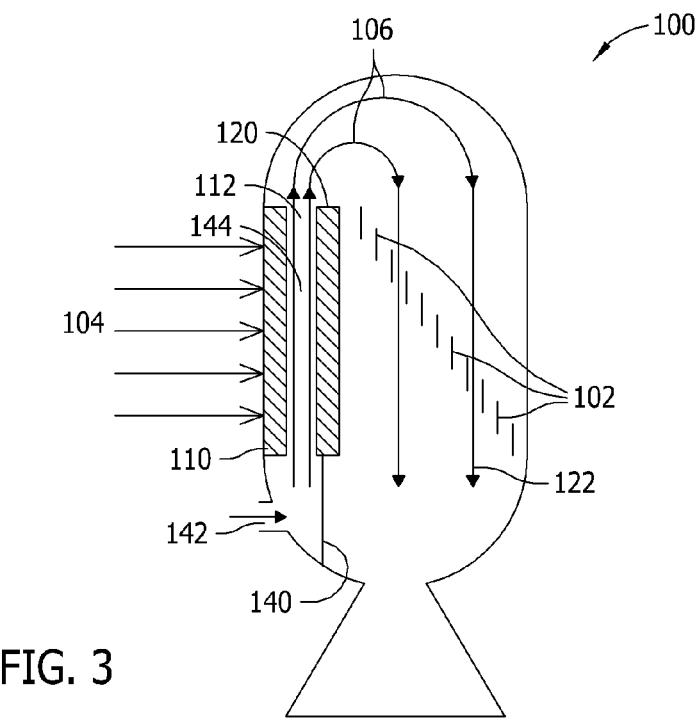
FIG. 3 is an illustration of a beam-powered engine that incorporates dual windows and a heat exchanger.

FIG. 3 is an illustration of an engine 100 having a chassis that defines a volume. The engine 100 incorporates a heat exchanger 102 according to one embodiment. Heat exchanger 102 converts electromagnetic energy from electromagnetic beam 104 into thermal energy of a working fluid 106 in the engine 100. As shown in FIG. 3, the system includes an outer window 110, also referred to herein as a first window 110, configured to confine a cold portion 112 of the working fluid 106 at high pressure relative to the outside environment. The outer window is transparent to the wavelength of the electromagnetic beam 104.

An inner window 120, also referred to herein as a second window 120, is configured to separate the cold portion 112 of the working fluid 106 from a hot portion 122 of the working fluid 106. The inner window 120 is transparent to the wavelength of the electromagnetic beam 104. Preferably, the inner window 120 reflects or absorbs thermal energy emitted by the heat exchanger 102 in the engine 100. In the illustrated embodiment, heat exchanger 102 is configured to absorb the electromagnetic beam 104 after the beam passes through both the outer window 110 and the inner window 120. As such, electromagnetic beam 104 may partially heat cooled fluid as fluid passes between first window 110 and second window 120. The system may further include heat exchanger 102 that emits thermal energy and a portion of thermal energy is absorbed with second window 120 to partially heat cooled fluid as fluid passes between first window 110 and second window 120. In addition, the system may further include, in one instance, first window 10 and second window 120 being transparent, semi-transparent, or substantially transparent to electromagnetic beams 104 of a specific wavelength.

The system further includes plumbing 140 that is configured to route the cold portion 112 of the working fluid 106 from an inlet 142 through the space 144 between the inner window 120 and the outer window 110. In one embodiment, the plumbing operates to direct a portion of the working fluid between the inner window 120 and the heat exchanger 102.

Figure 4:
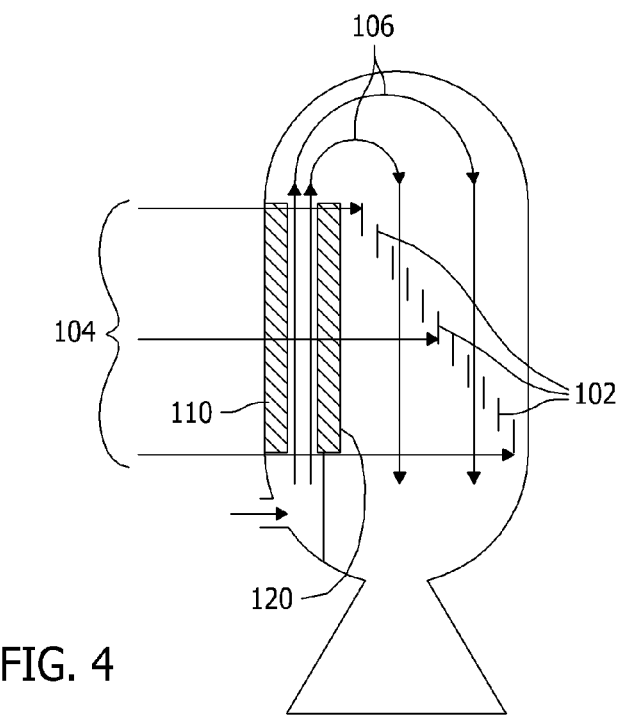
FIG. 4 illustrates an electromagnetic beam that passes through an outer window and an inner window of the engine of FIG. 3 for absorption by a heat exchanger.

As shown in FIG. 4, the electromagnetic beam 104 passes through the outer window 110 and the inner window 120 and is largely absorbed by the heat exchanger 102. To make best use of the energy available, the heat exchanger is a first surface heat exchanger that is configured to absorb 100 percent of the beam 104 and resist the flow of working fluid 106 as little as possible.

Figure 5:
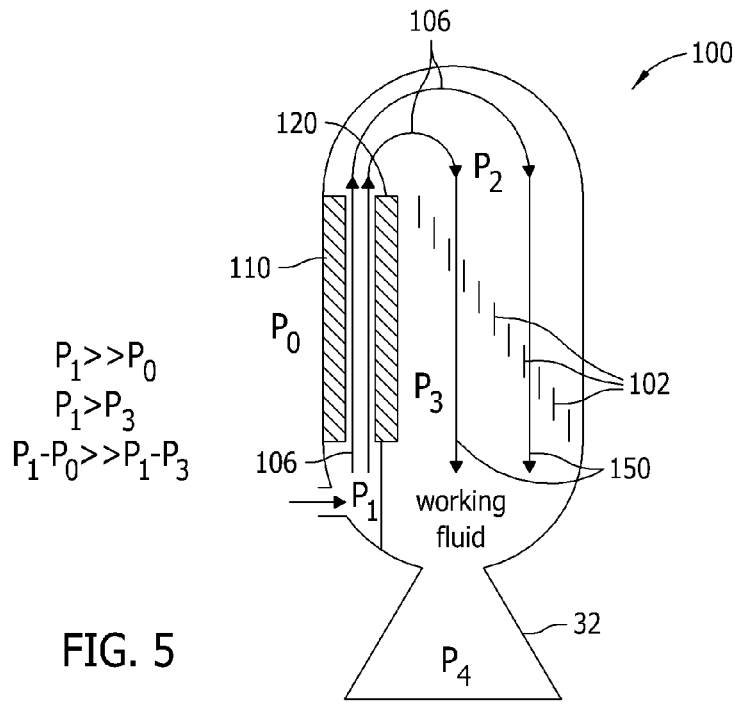
FIG. 5 illustrates pressure changes for the working fluid that passes through the engine of FIG. 3.
Figure 6:
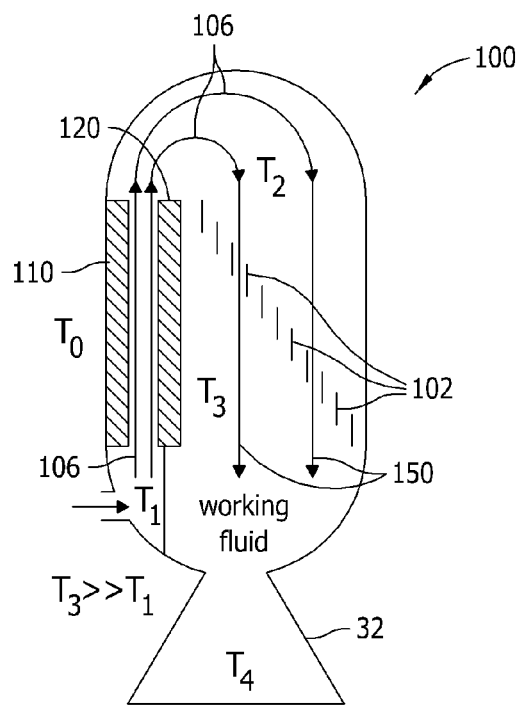
FIG. 6 illustrates temperature changes for the working fluid that passes through the engine of FIG. 3.

FIGS. 5 and 6 further illustrate fluid flow through the engine 100. Specifically, fluid 106 enters the fluid inlet 142 from a pump or pressurized tank (neither shown in FIG. 5). The fluid 106 is at an initial high initial pressure P1 and a relatively low initial temperature T1. The fluid 106 passes between the outer window 110 and the outer window 120, dropping slightly in pressure to P2 and heating up to T2 as it absorbs any heat radiated from the inner window 120. The working fluid 106 then turns and flows through the heat exchanger 102, dropping in pressure to P3 and becoming much hotter to T3. The heated fluid 150 then exits through the nozzle 32 to produce thrust. In a typical rocket implementation, the working fluid 106 is liquid before it reaches the heat exchanger 102, boils as it passes through the heat exchanger 102, and traverses the rest of the system as a hot gas.

As this cycle illustrates, the working fluid 106 exerts a large pressure difference on the outer window 110. For example, P1 may be hundreds or thousands of psi, while the ambient outside pressure P0 is typically less than sea level pressure of 15 psi. The outer window 110 remains cold, with high-altitude air on the outside and a liquid propellant e.g., liquid hydrogen (working fluid 106) on the inside side of the outer window 110.

The working fluid 106 exerts little pressure difference on the inner window 120. Though there is some pressure drop across the heat exchanger 102, there is a much greater drop through the nozzle 32. The inner window 120 is hot, with an average temperature midway between T1 and T3. The benefit of the two-window configuration described herein is that it exploits the superior strength of cold materials: the outer window 110 that supports a large structural load is cold, while the hot inner window 120 sustains very little load. As a result, the two windows can be made of different materials: a strong material for the outer window 110, and a high-temperature-tolerant material for the inner window 120.

Figure 7:
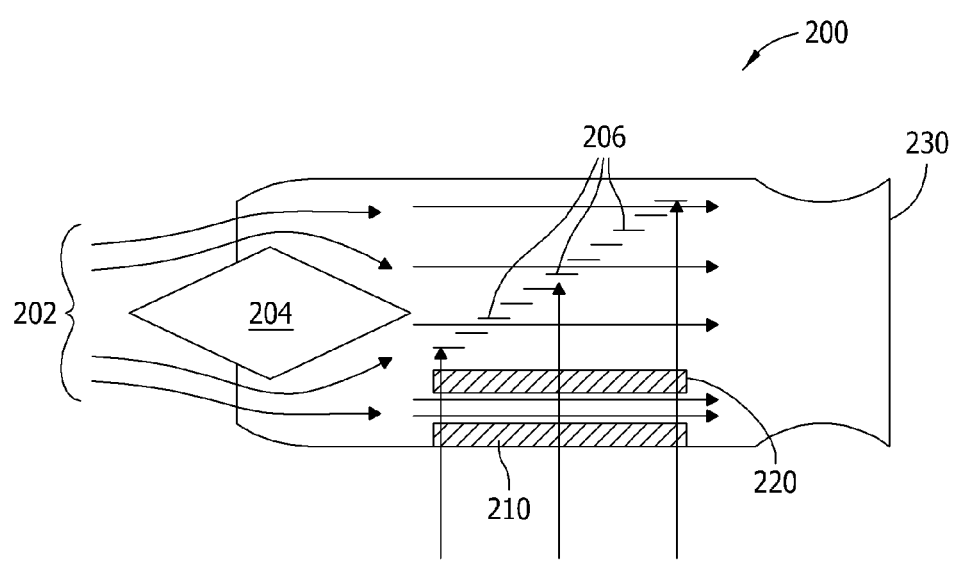
FIG. 7 illustrates a jet engine that incorporates the dual window and heat exchanger configuration of the rocket engine of FIG. 3.

The example embodiment discussed above is a rocket engine. FIG. 7 illustrates an embodiment that is incorporated within a jet engine 200 such as a ramjet. The working fluid 202, for example, air, flows in past the diffuser 204, slows, and rises in both pressure and temperature. Most of the air 202 heads for the heat exchanger 206, but some flows between the outer window 210 and the inner window 220 as depicted in the figure. The working fluid 202 passing through the heat exchanger 206 gets much hotter. These two flows join aft of the windows 210 and 220 and exit through the nozzle 230, producing thrust. As with the rocket engine 100, the outer window 210 is relatively cold and bears the pressure difference between the inside and outside of the engine 200. The inner window 220 is hot, but bears nearly zero pressure difference. Such embodiments may also be incorporated in turbojet or fanjet embodiments.

In one embodiment, the outer windows described herein are fabricated from a transparent structural composite material and the inner windows are multi-lens arrays.

In embodiments described herein, the heat exchanger described is a second surface heat exchanger. In such a heat exchanger, the pressure of the working fluid is contained by an opaque material, typically metal. The same material carries a high heat flux from the surface where it absorbs laser light to the surface in contact with the working fluid. The opaque material is typically configured as many small tubes. The embodiments also enable use of a first surface heat exchanger in which the surface that absorbs laser light is also the surface in contact with the working fluid. In such a configuration, the pressure of the working fluid is contained by a transparent material that carries little or no heat flux. In the windowed heat exchanger of FIG. 2, the working fluid's pressure is contained by a single large plate of transparent material that is hot on one side. In the configuration of FIGS. 3-6, the pressure of the working fluid is contained by a transparent material that is cool or cold on both sides.

In the described embodiments, a second surface heat exchanger imposes requirements on the tube material used therein. One of the requirements may be that the tube material needs to be heated to reach higher temperatures and in many instances as hot as possible so as to heat the working fluid to reach higher temperatures and in many instances as hot as possible. Another requirement is the tube material must be thin to reduce the temperature difference between the light absorbing surface and the working fluid. The requirements for thinness and high temperature may conflict with the requirement to contain a high pressure fluid. For example, high pressure may be required to achieve a good thrust-to-weight ratio in the engine. In addition, a requirement for high strength at high temperature may conflict with the need to conduct a large heat flux: titanium, for example, has good strength at high temperature, but is an order of magnitude worse conductor of heat than aluminum.

Advantageously, the described embodiments avoid the above mentioned conflicting requirements on the tube material by enabling a first surface heat exchanger. Specifically, the embodiments allow the working fluid to reach higher temperatures and pressures, thereby enabling high specific impulse and high thrust-to-weight ratio. For example, the pressure is confined by a structure that does not have to be especially thin or conduct much heat. The structure is therefore optimized to carry a load, allowing it to be lighter and made of cheaper material. Contrast to the windowed heat exchanger of FIG. 2 where the pressure of the working fluid is contained by a single thick plate of transparent material that is as hot as rocket or jet exhaust at its stagnation speed. As such, the described embodiments provide for the utilization of affordable transparent materials that may not exhibit high strength properties when they are hot. In summary, the described embodiments avoid the requirement of a typically thick windowed heat exchanger; therefore, these embodiments avoid the utilization of a quite heavy, plate of transparent material.

Advantageously, the described embodiments replace the single, thick transparent plate with two transparent plates that are both thinner than the single thick plate. The outer window is substantially thinner because it carries about the same load but at much lower temperature. The inner window is much thinner because it carries little structural load. Therefore, the overall weight of the described embodiments is less than known solutions which improves the thrust-to-weight ratio of the engine. In addition, each of the two window plates can be made of less exotic and costly material than the single thick plate, which reduces cost.

In one embodiment, technical effects of the methods, systems, and computer-readable media described herein include at least one of: (a) receiving cooled fluid from a fluid source, (b) directing the cooled fluid between a first window configured to operate as a structural member of the engine and a second window configured to separate the cooled fluid from a heated fluid, (c) passing an electromagnetic beam through the first window and the second window, (d) absorbing the passed electromagnetic beam with a heat exchanger within the engine, and (e) directing the cooled fluid through the heat exchanger to become heated fluid.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for producing a heated fluid for use within an engine for propulsion of a vehicle, said method comprising:
    receiving cooled fluid from a fluid source;
    directing the cooled fluid between a first window configured to operate as a structural member of the engine and a second window configured to separate the cooled fluid from a heated fluid;
    passing an electromagnetic beam through the first window and the second window;
    absorbing the passed electromagnetic beam with a heat exchanger within the engine; and
    directing the cooled fluid through the heat exchanger to become heated fluid.

2. The method according to claim 1 wherein directing the cooled fluid between a first window and a second window facilitates confining cold working fluid at high pressure relative to the outside environment.

3. The method according to claim 1 further comprising utilizing the electromagnetic beam to partially heat the cooled fluid as the fluid passes between the first window and the second window.

4. The method according to claim 1 wherein absorbing the passed electromagnetic beam with a heat exchanger comprises absorbing the beam with a first surface heat exchanger.

5. The method according to claim 1 wherein directing the cooled fluid through the heat exchanger to become heated fluid comprises routing a portion of the cooled fluid between the second window and the heat exchanger.

6. The method according to claim 1 further comprising absorbing a portion of thermal energy emitted by the heat exchanger with the second window to partially heat the cooled fluid as the fluid passes between the first window and the second window.

7. An electromagnetic beam powered propulsion system comprising:
    a chassis that defines a volume and comprising an inlet;
    a first window integrated with said chassis, said first window substantially transparent to an electromagnetic beam;
    a second window disposed within said chassis, said second window substantially transparent to the electromagnetic beam;

a heat exchanger placed within said chassis and operable to absorb electromagnetic beams that pass through said first window and said second window; and a working fluid, said chassis configured to route said working fluid at a first temperature from said inlet into a passage defined between said first window and said second window, said chassis configured to further route said working fluid through said heat exchanger such that said working fluid is raised to a second temperature, the second temperature making said working fluid operable for propulsion.

8. The electromagnetic beam powered propulsion system according to claim 7 wherein said first window comprises a structure operable to confine said working fluid at the first temperature at a high pressure relative to an outside environment.

9. The electromagnetic beam powered propulsion system according to claim 7 wherein said chassis is configured to route a portion of said working fluid between said second window and said heat exchanger.

10. The electromagnetic beam powered propulsion system according to claim 7 wherein said second window is configured to absorb a portion of thermal energy emitted by said heat exchanger to partially heat said working fluid as said working fluid passes between said first window and said second window.

11. The electromagnetic beam powered propulsion system according to claim 7 wherein said chassis comprises a portion of one of a jet engine and a rocket engine.

12. The electromagnetic beam powered propulsion system according to claim 7 wherein said heat exchanger comprises a first surface heat exchanger.

13. The electromagnetic beam powered propulsion system according to claim 7 wherein said first window and said second window are transparent to an electromagnetic beam of a specific wavelength.

14. The electromagnetic beam powered propulsion system according to claim 7 wherein said second window comprises a structure operable to separate said working fluid at the first temperature from said working fluid at the second temperature.

15. A vehicle engine comprising:
a chassis comprising a tank configured for storage of a working fluid at a first temperature;
a first window integrated with said chassis, said first window substantially transparent to an electromagnetic beam;
a second window disposed within said chassis, said second window substantially transparent to the electromagnetic beam;
a heat exchanger placed within said chassis and operable to absorb electromagnetic beams that pass through said first window and said second window; and
a nozzle, said chassis configured to route the working fluid from said tank into a passage defined between said first window and said second window, said chassis configured to further route the working fluid through said heat exchanger such that the working fluid is raised to a second temperature, said chassis configured to further route the working fluid at the second temperature through said nozzle to provide propulsion.

16. The vehicle engine according to claim 15 wherein said first window comprises a structure operable to confine the working fluid at the first temperature at a high pressure relative to an outside environment.

17. The vehicle engine according to claim 15 wherein said second window comprises a structure operable to separate the working fluid at the first temperature between said windows from the working fluid proximate said heat exchanger at the second temperature.

18. The vehicle engine according to claim 15 wherein said chassis is configured to route a portion of the working fluid between said second window and said heat exchanger.

19. The vehicle engine according to claim 15 wherein said second window is configured to absorb a portion of thermal energy emitted by said heat exchanger to partially heat a portion of the working fluid that passes between said first window and said second window.

20. The vehicle engine according to claim 15 wherein said first window comprises a transparent structural composite material and said second window comprises at least one multi-lens array.

* * * * *